Patented Apr. 14, 1942

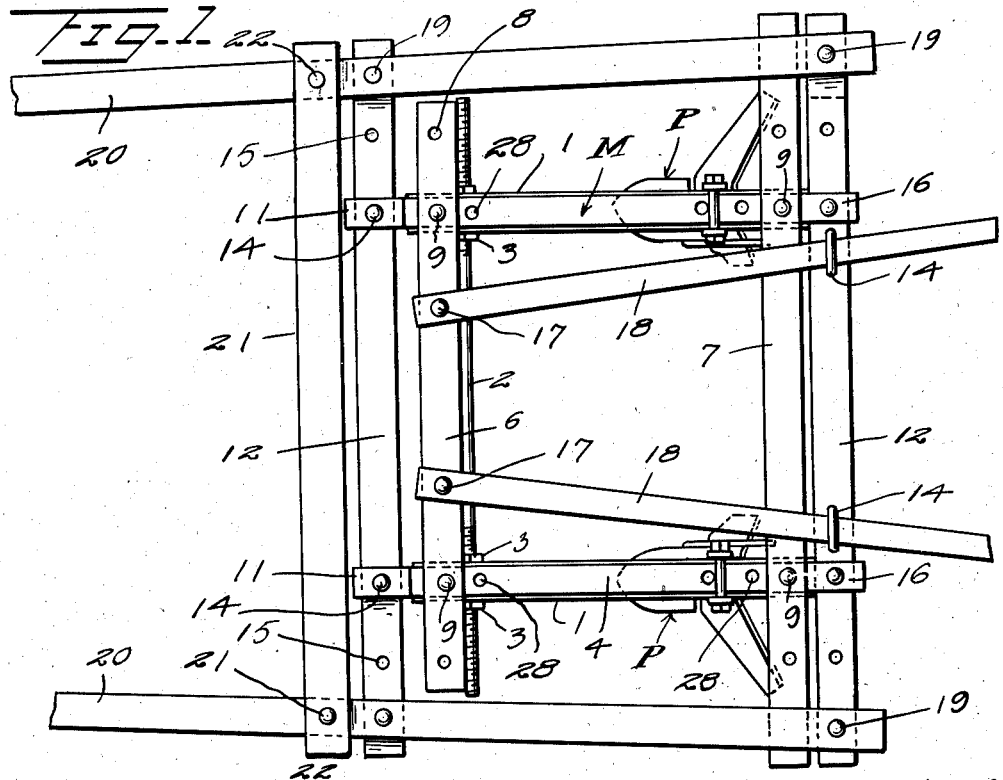

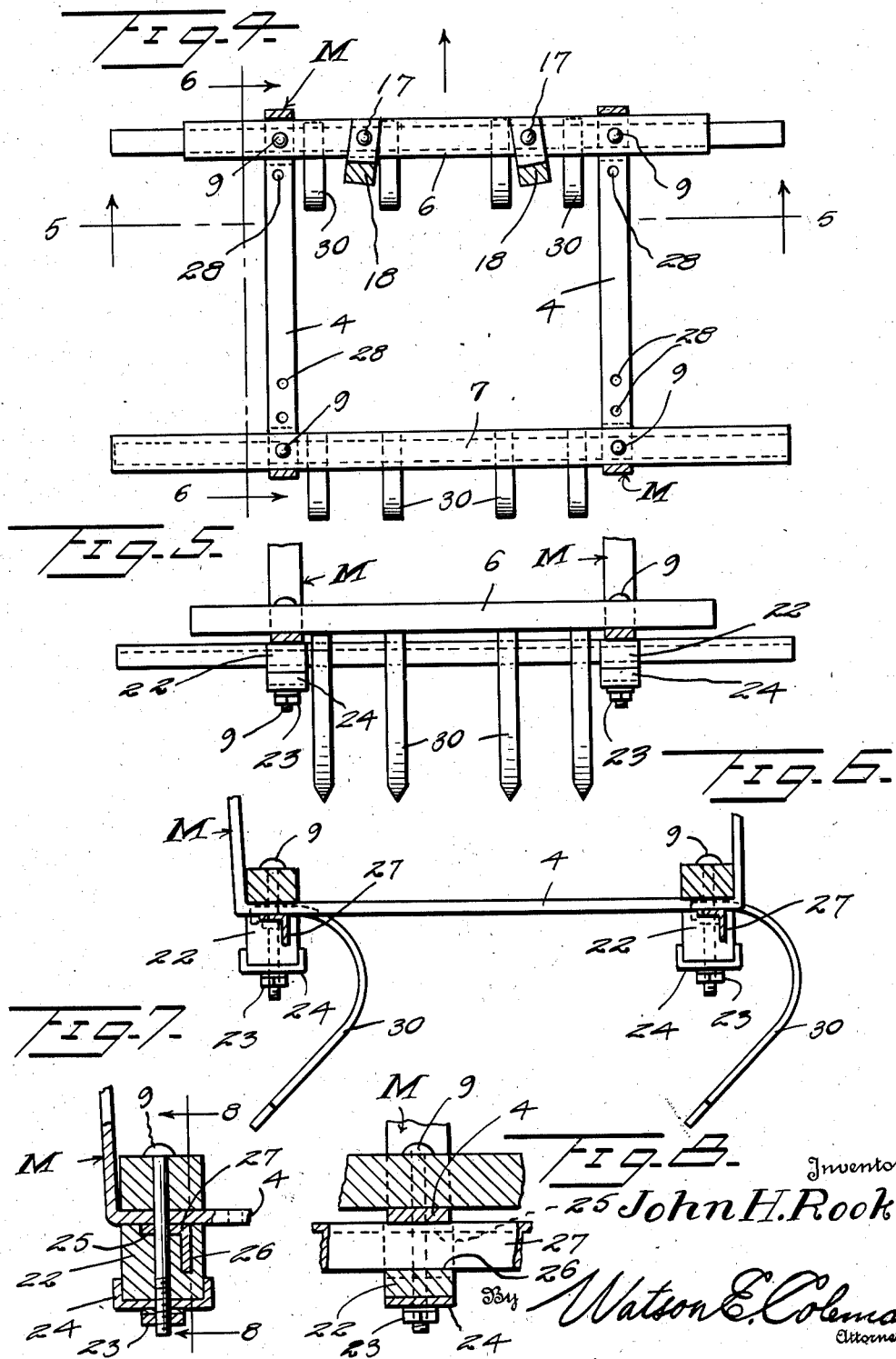

2,280,008

UNITED STATES PATENT OFFICE 2,280,008

CULTIVATING APPARATUS

John H. Rooks, Springvale, Ga.

Application March 6, 1941, Serial No. 382,074

6 Claims. (Cl. 97—172)

This invention relates to a cultivating apparatus, and it is an object of the invention to provide a device of this kind which is particularly adaptable for use in boll weevil control.

It is also an object of the invention to provide a device of this kind which is light in weight and which is also of a character to permit the use of different types of ground working tools and wherein the device is so constructed as to be readily adjusted for use between differently spaced rows as for example between cotton rows or between rows of peanut vines.

Furthermore, it is an object of the invention to provide a device of this kind which with but slight adjustment and reassembling may be employed with equal facility in connection with cultivating plows, spring harrow teeth and kindred ground working elements.

The invention consists in the details of construction and in the combination and arrangement of the several parts of my improved cultivating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a cultivating apparatus constructed in accordance with an embodiment of my invention;

Figure 2 is a view in side elevation of the device as illustrated in Figure 1, the ground engaging member being shown in fragment;

Figure 3 is a detailed sectional view taken substantially on the line 3—3 of Figure 2;

Figure 4 is a view, partly in section and partly in top plan, illustrating the apparatus for use with spring harrow teeth, the line of section being substantially on the line 4—4 of Figure 2;

Figure 5 is a detailed sectional view taken substantially on the line 5—5 of Figure 4;

Figure 6 is a detailed sectional view taken substantially on the line 6—6 of Figure 4;

Figure 7 is a fragmentary detailed sectional view with a portion in elevation illustrating the means as herein embodied for holding a spring tooth harrow in working position; and Figure 8 is a fragmentary detailed sectional view on the line 8—8 of Figure 7, with certain of the parts in elevation.

As disclosed in the accompanying drawings, my improved apparatus comprises two elongated beams 1 of desired length and arranged side by side in desired spaced relation. These beams 1 are also substantially in parallelism and the opposite end portions thereof are connected by the spacing rods 2. Each of these rods has its end portions removably insertible through the beams 1 and threading upon each of these rods 2 at opposite sides of a beam 1 for clamping engagement therewith are the holding nuts 3.

Relative spacing of the beams 1 depends upon the character of the work with which the apparatus is to be employed. When used for cultivating adjacent rows of peanut vines these beams are about twenty-four inches apart but when used between adjacent rows of cotton they are spaced apart approximately thirty-six inches. The rods 2 may each be of a length for use in connection with either of such spacings or, if preferred, a separate rod of required length may be employed for each of the different spacings of the beams 1.

Resting from above upon each of the beams 1 is a U-shaped member M, the intermediate or base portion 4 of which is of a length substantially equal to the length of the beam 1. The side arms 5 of the member M are of desired length and it is to be stated that both of the members M are of duplicate construction.

Bridging the space between the beams 1 and contacting from above with the intermediate portions 4 of the members M are the cross beams 6 and 7. These beams 6 and 7 are substantially in parallelism and are provided in their opposite end portions with the spaced openings 8 in which are adapted to be selectively inserted the holding bolts 9. These bolts 9 extend through the adjacent or underlying parts of the intermediate portions of the members M and also through the end portions of the beams 1. These bolts 9 are herein disclosed as being inserted from above and the lower extremities thereof have threaded thereon the holding nuts 10 which coact with the under faces of the beams 1. The openings 8 at each end of the beams 6 and 7 are so positioned and spaced apart a distance whereby the beams 1 may be fastened thereto in accordance with the desired spacing of the beams 1 either for cultivation between adjacent rows of peanut vines or between rows of cotton.

The upper ends of the side arms 5 of the members M are outwardly and laterally disposed to provide short plates 11 with which engage from below the opposite end portions of the top cross beams 12. These cross beams 12 are secured to the plates 11 by the bolts 14 which are selectively insertible through the spaced openings 15 in the end portions of the beams 12 as determined by the desired spacing of the bottom beams 1.

The outer ends of the plates 11 are provided with the depending lugs 16 spaced from the adjacent upper end portions of the arms 5 a distance to snugly receive between said lugs 16 and the side arms 5 the upper cross beams 12. By this arrangement the shifting of the parts to either of the desired positions for spacing the beams 1 is materially facilitated.

Suitably anchored, as at 17, to the central portion of the front cross beam 6 are the lower end portions of the elongated handles 18. These handles extend upwardly and rearwardly on an incline and contact from above with the rear cross beam 12 and clamped, as at 14, or otherwise securely connected to said rear cross beam 12. As is clearly illustrated in Figure 1 of the drawings, these handles 18 are so positioned as to offer no interference or obstruction to the required relative spacing of the bottom beams 1.

Resting from above upon the opposite end portions of the beams 12 and secured thereto by the bolts 19 or the like are the rear portions of the shafts 20. These shafts 20 in advance of the front cross beam 12, but in relatively close proximity thereto, are connected by a cross member 21. This cross member 21, as herein disclosed, is secured to the shafts 20 by a conventional bolt 22.

The bottom beams 1 are adapted to have secured thereto the desired ground working implements. In the present embodiment of my invention these beams 1 at the rear parts thereof carry the cultivating plows P preferably of a type as comprised in Patent #2,087,118 dated July 13, 1937, and which plow is particularly advantageous in combating boll weevils.

As illustrated in Figures 4 to 8 of the drawings the apparatus is disclosed in an assembly wherein spring tooth harrows are employed in lieu of the plows P. In this particular assembly the beams 1, as comprised in Figures 1 to 3, are omitted and the bolts 9 are directed through the cross beams 6 and 7 and through the underlying parts of the intermediate or base portions 4 of the members M. These bolts 9 are also disposed downwardly through the blocks 22 underlying the portions 4 of the member M and clamped tightly thereagainst by the conventional nuts 23 threading upon the bolts 9 below the blocks 22 and which, as herein disclosed, have direct coaction with the wear caps or plates 24 underlying the bottom surfaces of the applied blocks 22.

The faces of the blocks 22 contacting the under surfaces of the portions 4 of the members M are provided thereacross with a groove or channel 25 and at one side of the channel with a depending pocket or recess 26. Each of these channels 25 and pockets or recesses 26 snugly receives a portion of a harrow bar 27 herein disclosed as in the form of an angle iron. By this means it is believed to be readily apparent that a harrow bar is effectively and securely maintained in a desired position and with the harrow bar disposed in a direction substantially at right angles to the line of travel of the apparatus.

As herein disclosed, the bars 27 are two in number, and the bars 27 may also be selectively adjusted one with respect to the other within certain limits, depending upon in which of the spaced openings 28 of the portions 4 of the members M the bolts 9 may be inserted.

The harrow teeth 30 are of any preferred type and are secured in any well-known manner to the bars 27 as requirements of practice may prefer. In Figures 4 and 5 these teeth 30 are illustrated as being so positioned as to cultivate two plant rows at a time.

From the foregoing description it is thought to be obvious that a cultivating apparatus constructed in accordance with my invention is particularly well adapted for use by reason of the convenience and facility with which it may be assembled and operated.

I claim:

1. A cultivating apparatus comprising a pair of spaced and substantially parallel bottom beams to which ground working implements are to be attached, cross beams bridging the space between the bottom beams, means for detachably connecting the cross beams to the bottom beams, U-shaped members mounted upon the bottom beams, the base portions of said members extending between the bottom beams and cross beams, the means for connecting the bottom beams and cross beams also holding the U-shaped members in position, top cross beams, means for securing the same to the upper extremities of the side arms of the U-shaped members, handle members secured to the forward lower cross beam and to the rear upper cross beam, shafts, and means for securing the rear portions of the shafts to the upper cross beams.

2. A cultivating apparatus comprising a pair of spaced and substantially parallel bottom beams to which ground working implements are to be attached, cross beams bridging the space between the bottom beams, means for detachably connecting the cross beams to the bottom beams, U-shaped members mounted upon the bottom beams, the base portions of said members extending between the bottom beams and cross beams, the means for connecting the bottom beams and cross beams also holding the U-shaped members in position, top cross beams, means for securing the same to the upper extremities of the side arms of the U-shaped members, handle members secured to the forward lower cross beam and to the rear upper cross beam, shafts, and means for securing the rear portions of the shafts to the upper cross beams, the upper end portions of the side arms of the U-shaped members being provided with outwardly disposed plates to overlie the upper cross beams, said plates having depending lugs to overlie the outer side faces of the upper cross beams, the means for securing the upper cross beams to the side arms comprising bolts insertible through the upper cross beams and the plates.

3. A cultivating apparatus comprising a pair of spaced and substantially parallel bottom beams to which ground working implements are to be attached, cross beams bridging the space between the bottom beams, means for detachably connecting the cross beams to the bottom beams, U-shaped members mounted upon the bottom beams, the base portions of said members extending between the bottom beams and cross beams also holding the U-shaped members in position, top cross beams, means for securing the same to the upper extremities of the side arms of the U-shaped members, handle members secured to the forward lower cross beam and to the rear upper cross beam, shafts, means for securing the rear portions of the shafts to the upper cross beams, and spacing rods interposed between and connecting the opposite end portions of the bottom beams.

4. A cultivating apparatus comprising a pair of substantially U-shaped side members, transverse beams interposed between and connecting the base portions of the side members, top cross beams, means for securing said top beams to the upper extremities of the side arms of the U-shaped members, handle members secured to the forward lower cross member and to the rear upper cross member, draft rigging secured to the upper cross beams, and ground working members operatively supported by the side members.

5. A cultivating apparatus comprising a pair of substantially U-shaped side members, transverse beams interposed between and connecting the base portions of the side members, top cross beams, means for securing said top beams to the upper extremities of the side arms of the U-shaped members, handle members secured to the forward lower cross member and to the rear upper cross member, draft rigging secured to the upper cross beams, a tooth harrow including a bar and means for anchoring the bar of the harrow to the side members with said bar bridging the space between the side members.

6. A cultivating apparatus comprising a pair of substantially U-shaped side members, transverse beams interposed between and connecting the base portions of the side members, top cross beams, means for securing said top beams to the upper extremities of the side arms of the U-shaped members, handle members secured to the forward lower cross member and to the rear upper cross member, draft rigging secured to the upper cross beams, a tooth harrow including a bar, said bar being of a length to bridge the space between the base portions of the side members and to extend thereacross and means for detachably securing said bar to said base portions of the side members.

JOHN H. ROOKS.